2,793,949

METHOD OF PREPARING COMPOSITE PRODUCTS CONTAINING METALLIC AND NON-METALLIC MATERIALS

Georges Imich, Asnieres, France

No Drawing. Application December 10, 1951, Serial No. 260,933

Claims priority, application France December 18, 1950

10 Claims. (Cl. 75—135)

The present invention relates to the incorporation of inorganic substances with metals and to the resultant products.

As is known, the sole industrial method used up to now for manufacturing articles composed of more or less intimate mixtures of metals with other materials is the method based on sintering. This method consists in mixing powdered metals with other powdered metals or materials and subjecting the mixture to compression, generally while in a heated state but at a temperature below the melting point of the metal or metals used in the preparation.

The preparation of such mixtures, starting from molten metal, was not possible up till now; even when the materials to be incorporated have specific weights very close to that of the molten metal, stable mixtures cannot generally be obtained because of the high interfacial tension which exists between molten metals and other materials. A typical example illustrative of the effect of surface tension is that of alumina films, or grains, which float on the surface of molten aluminum in spite of the fact that their density (about 3.9) is much greater than that of the metal (2.38).

This is the difficulty which has made it impossible up until now to prepare several very valuable metal-containing products by mixing desired substances with molten metal, and which has compelled metallurgists to use the more expensive and complicated sintering method mentioned above.

The present invention overcomes this drawback through the use of agents which cause the metallic or non-metallic materials to be incorporated, to become wetted by the molten metals used.

Such agents are chosen among substances which are capable of lowering the surface tension between the metals and materials under consideration. More often than not, these agents are elements or compounds containing elements which have, themselves, a rather low surface tension.

According to the invention, the said agents may be added to one or more of the metals and/or materials used before, after, or simultaneously with the operating step of bringing said substances together. For example, surface tension lowering agents may be preliminarily alloyed with the starting metal, or added at the same time as the particles of material to be incorporated. The compounds chosen as addition agents may be united beforehand to said particles, or added after the same are brought together with the metal. In all cases, there may be used products which contain the desired addition agent as a natural or commercial impurity.

As a rule, the composite products, according to the invention, which comprise at least one metal having incorporated therein another metal, metalloid or compound, are obtained through a procedure having one or more steps. This procedure comprises essentially the operation of bringing together the materials under consideration while the first-named metal is completely or partially molten, i. e. while it is in a liquid or pasty condition; in other words, the operation is carried out at a temperature corresponding at least to the beginning of the melting point or melting range of the metal.

This operation may consist in simply mixing the materials under consideration in the presence of the addition agent, or in forcing them one into the other following any known method using pressure, centrifugal or centripetal force, vacuum, condensing vapors or other means.

A very important manner of carrying out the invention comprises dispersing, while stirring, pieces, grains, flakes, fibres, wires, powders or other shaped solids in liquid or pasty metal. When the product is eventually to be used at ordinary temperatures, the resultant dispersion is cooled and shaped, or cast and then cooled while the continuous metallic phase solidifies.

When only a small proportion of metal is mixed with solid powdered substances, a powdered composite product may be obtained; this may then be compressed to the desired shape.

There are a large number of substances which can be used as the wetting agents referred to above. The nature of the wetting agents to be chosen in a given case depends upon several factors, such as the nature of the materials involved, the temperatures, the desired concentrations of the incorporated materials, etc., and moreover, upon the compatibility of the agent with the materials present.

When carrying out the process of my invention, I generally prefer to choose as suitable wetting agents elements such as metalloids having an atomic number higher than 13—except halogens—for example S, Se, Te, Si, alkaline-earth metals, including Li and Mg or compounds—other than halides—of these elements.

In many applications, particularly good results are obtained with alkaline-earth metals, with magnesium or with silicon. For example, when a stable dispersion of alumina grains in molten aluminum is to be prepared, the presence of iron which lowers the surface tension of this metal may be useful, but the dispersing power of the molten aluminum is increased if silicon be used as wetting agent; better still, if Mg be used and particularly, calcium.

In fact, it has been determined by measuring the interfacial tension between, for example, molten aluminum and molten cryolite, that the tension, which is of about 170 dynes/cm. for substantially pure aluminum, drops to about 70 when 1% Si is added to the Al and decreased below 40 with calcium.

These wetting agents can be employed in their elementary form, and if desired, can be alloyed preliminarily with Al, or they can be used in the form of any non-halide compound, preferably reduced more or less, by Al; for example, there can be used silicates, chalk, magnesia, calcium carbide, etc. Of course, several such wetting agents may be used simultaneously.

The proportion of wetting agent to be employed depends upon the nature of materials used, upon the degree of their comminution, their shape, temperature, desired concentration and other factors; it may vary to a considerable extent.

As in the case of wetting agents used with non-metallic liquids, agents according to the present invention may, in certain cases, enable the preparation of the above defined composite products, even when they are used in very slight amounts, say about or below 0.01% by weight of the product. More frequently, the content of the agent varies from about 0.1% to more than 10%. On the other hand, there are certain applications where the substance which is used as the wetting agent may itself be employed as the material or one of the materials which is desired as a constituent of the composite product; in that event, a much larger proportion thereof may be used, for example, up to 90% of the total weight.

Composite products, according to the invention, may be obtained with several molten metals, or metalloids having a metallic appearance as, for example: Zn, Cd, Pb, Sb, Bi, Fe, Cu, Sn, Al, Mg, Si, Te, Ca, Na, etc., used by themselves or in the form of alloys.

Particularly valuable and diversified industrial products are obtainable with light metals and, especially, with aluminum and its alloys. Thus, alloys of several metals with more than 50% Al are very useful in many applications.

When the metal used is itself one of those which are, as mentioned above, capable of acting as wetting agents, for example, Mg, Ca, Ba, Na, Si, there is often no need for adding another agent; however, this may be done to improve the incorporation of the desired materials with the metal, for example, as when calcium, barium or strontium is added to silicon or magnesium. Several solid or fused materials, as well as gases, may be incorporated with molten metals by means of the new process of the present invention. The various industrial uses govern the choice of material to be incorporated; among the several and diverse substances which can be used are, for example: metals, metalloids, simple or complex oxides, carbides, nitrides, borides, silicides, sulphides, cyanides, phosphides, arsenides, etc. Numerous minerals and ores can be used.

Among the several substances which can be incorporated with metals according to the invention, the following materials are cited by way of example, but not by way of limitation: emery, corundum, burnt alumina, flint, quartz, kieselguhr, ochre, hematite, garnet, granite, Carborundum, carbides of tungsten, molybdenum, titanium, etc.; diamond, graphite, hard metals as Mo, W, etc.; several alloys, for example: cast iron or hard steels containing Mo, Mn, Si, Cr, W, etc.; ores such as wolframite, scheelite, molybdenite, chromite, rutile, cassiterite, etc. On the other hand, several natural or synthetic silicates and silico-aluminates, such as glass, fired-clay, kaolin, mica, asbestos, talcum, bentonite, etc., which can be dispersed in metals, can themselves serve as wetting agents for incorporating other substances.

There are cases where the walls of containers or crucibles in which the incorporation is carried out, exert a wetting action on the materials which are to be mixed. For example, when the process of the invention is applied to aluminum and to its alloys poor in Mg, or free of Mg, the incorporation is brought about more easily when effected in refractory earth (fired-clay) crucibles, than in metallic or graphite crucibles.

The ratio of the substances incorporated with the liquid or pasty metal may vary to a considerable extent, according to the qualities and the intended uses of the composite products of this invention. For example, to modify the structural properties of any metals, it is recommended to disperse therein slight amounts—less than 1%, say 0.1%—of powders or crystalline materials. On the other hand, when the object is to obtain, for example, abrasive composition, the ratio of hard materials to be mixed with the molten metal should preferably exceed 50% by volume of the composite product, and may reach 95%. As the process of the invention can be applied to metallothermy, for example, aluminothermy, or to carrying out of reactions between different substances in a liquid metallic medium, the more suitable volumetric ratio of materials dispersed in a molten metal is generally, in such applications, comprised between about 5% and 50% of the dispersion. For certain electrical uses, products may be manufactured which contain only about 1% to 5% of metal.

The process may also be carried out by blowing a gas into a molten metal or into a preliminarily prepared dispersion; for example, light porous products may thus be obtained by blowing air, nitrogen, hydrocarbon, ammonia or other gas into a calcium or barium containing aluminum alloy.

So far, my invention has been described as applied to molten metals or metals having a pasty consistency. However, I have determined that the addition of interfacial tension lowering substances may be very useful even when metals in solid state, particularly powders, are used, as in the known sintering method. The preparation of products by hot compression of metal powders, eventually with other materials, may be improved by the addition of wetting agents as above described.

I have stated that halides, particularly alkali and alkaline-earth chlorides, exert an inhibitory action on the incorporation of several materials with molten metals. When there is only a very slight proportion of halide present, the wetting of the materials by the metals may be merely more difficult and require a greater ratio of wetting agent, or a more active agent. However, when larger proportions—say any percentage—of halides and, particularly, those of alkali or alkaline-earth metals, or $MgCl_2$, $ZnCl_2$, etc., are present, the incorporation can be completely hindered. Therefore, if the separation of the constituents of a composite product be desired, the product can be treated with any percentage of a halide, preferably in a molten condition, and at a temperature above the melting point of the metal which has to be recovered.

Complex compounds of fluorine, such as fluosilicates, fluotitanates, etc., do not act like halides, as long as the formation of fluorides does not take place through dissociation by heating.

In order to make my invention better understood, the following examples are given to illustrate the invention; however, it is understood, that these examples do not limit the scope of the invention in any fashion.

*Example 1*

100 gr. of molten zinc are mixed with 100 gr. of a powdered product containing 97 gr. of molybdenum carbide $Mo_2C$, previously heated to about 500° C. with 3 gr. of glass powder mixed therewith. The resultant suspension is molded under pressure.

*Example 2*

1 kg. of cast iron containing 12% silicon is melted and mixed, with stirring, with 2 kg. powdered Carborundum; the mass is poured into a mold and cooled.

*Example 3*

350 gr. of corundum powder, having a mesh size of 70–100, are mixed with 20 gr. of powdered fused silicate having substantially the following composition: 77% $SiO_2$–12% $Na_2O$–7% CaO–4% $K_2O$. The mixture is then added to 1000 gr. (1 kg.) of commercial 99.5% aluminum melted in a refractory earth crucible. The mass is stirred until homogeneity is obtained.

*Example 4*

3 kg. molten aluminum alloy containing 4% Si, 0.7% Mg and 0.4% Mn are stirred with 1.8 kg. Carborundum of 20 mesh and with 15 gr. of talcum. When all the Carborundum grains are in suspension in the liquid metal, the suspension is maintained in quiescent condition for one hour at about 700° C. Thereupon, 1.95 kg. of metal is decanted from the upper part and is removed, being practically free of Carborundum. A bottom fraction consisting of 2.86 kg. concentrated suspension remains; this is molded and cooled.

*Example 5*

1 kg. of commercial aluminum is melted in a refractory earth crucible. Cold, white silica sand is added until the metal becomes pasty, and the heating is then so regulated that the consistency remains pasty while sand is added with mixing. After 200 gr. of sand have been incorporated, the pasty mass is heated to 680° C., when the metal becomes completely liquid. The resultant dispersion is maintained at about 680° C. for one-half hour in quiescent condition, whereupon 700 gr. of metal from the upper part is removed, while the remaining bottom portion consists of a dispersion of 40% sand in 60% aluminum.

Example 6

4 kg. of a hard steel containing about 0.4% C, 0.6% Mn, 2.5% Ni, 0.7% Cr and 0.6% Mo is crushed to coarse pieces, 5 to 30 mm. in size, and soaked with a commercial solution of sodium silicate which is then drained off and the pieces are dried. The drying is completed by heating to about 400° C. The pieces are then introduced into 1 kg. of molten aluminum, containing 0.7% Mg, and the resultant dispersion is cooled to solidify it.

Example 7

1 kg. of asbestos fibers are sandwiched between two steel screens, weighing each 100 gr., which are placed within a vessel having an inlet at its bottom and an outlet in a tightly closed cover. The inlet is connected with another vessel which contains molten magnesium, while the outlet is in communication with a vacuum pump. The vessel containing the asbestos is heated up to about 650° C. while a vacuum is created, whereby molten magnesium slowly impregnates the asbestos fibers. When about 600 gr. of magnesium have been introduced, the asbestos fibers and steel screens are completely submerged. The vessel is then cooled and the resultant composite product removed.

Example 8

500 gr. of powdered tungsten carbide, WC, are intimately mixed with 20 gr. of crushed glass having approximately the following compositions: 74% $SiO_2$–14% $K_2O$–4% $Na_2O$–6% CaO–2% PbO. The mixture is heated to about 650° C. and is then impregnated by centrifuging at a temperature above 650° C. with 50 gr. of an aluminum alloy containing 6% magnesium.

Example 9

400 gr. of "Duralumin," that is, an alloy having a content of about 90% to 95% Al, 3.5 to 4.8% Cu and minor proportions of Mg, Mn, Si and Fe, are melted. To the melt there are progressively added, with stirring, 265 gr. of corundum of 50 mesh, containing 2 gr. anhydrous calcium silicate, while the temperature of the melt is kept in a range which does not exceed by more than 5° the melting point of the "Duralumin." The liquid mass so obtained is poured into a heated centrifugal mold and centrifuged at about 680° C. After cooling, the resultant disc (wheel) contains 87% by weight of corundum at its periphery, and substantially pure metal in the centre.

Example 10

To 1 kg. zinc alloy containing 15% calcium, which is in a molten state and very near its melting point (eutecticum 633° C.), there are added while stirring 650 gr. of crushed granite. The mass is poured into a form and solidified by cooling.

Example 11

80 gr. of fine burnt alumina powder, the particles of which have a diameter of 0.5 to 20 microns, are added to 1 kg. of a molten Al alloy containing 5% Mg and 0.5% Mn. The powder is first permitted to become heated on the surface of the melt, thereupon the whole mass is stirred until the alumina is dispersed. The suspension thus obtained is maintained in a quiescent condition for two hours at about 700° C. After solidification, the resultant product is hot rolled.

Example 12

A suspension of about 5% extremely fine alumina is obtained by blowing air into molten aluminum containing 5% calcium.

Example 13

1 kg. of an alloy 90% Al–10% Ca, is heated to about 900° C.; a mixture composed of 250 gr. of rutile having 95% $TiO_2$ and 150 gr. calcium carbide, and of a 70 to 100 mesh size, is added to the metal progressively in very small portions while the liquid is thoroughly agitated. The resultant suspension is left quiescent and thereupon, the lower layer of metal, which contains about 150 gr. titanium carbide, is removed.

Example 14

250 gr. of powdered scheelite of 80–100 mesh size, having 61% $WO_3$, are slowly and progressively poured, with stirring, into 1 kg. of molten aluminum containing 3% Mg. After standing two hours, the lower portion—about 500 gr.—of the suspension is separated; it contains metallic tungsten. The upper portion (upper layer) composed of alumina, chalk and minerals derived from the scheelite used, is added with 50 gr. of a flux comprising 60% by weight anhydrous carnallite and 40% $CaCl_2$. Thereupon, the dispersed substances separate and the metal is recovered and reused.

Example 15

900 gr. of Carborundum of 40 mesh size, preliminarily mixed with 6 gr. of fired dolomite, are heated up to about 670° C.; 100 gr. of molten alloy having substantially 94.5% Al–5% Mg and 0.5% other elements, are then poured little by little, with mixing, on the hot powder. The pulverulent product thus obtained is screened through a 40 mesh screen and the oversize is hot-compressed to form a very hard composition.

Example 16

2 gr. of very fine tellurium powder are mixed with 148 gr. of powder composed of 66 gr. iron and 82 gr. alumina. The mixture is pressed at a pressure of 2000 kg./cm.$^2$ and sintered at about 1380° C.

In the practice of my invention, I have observed that in those instances where a metal is recovered, that very frequently the metal so recovered when treated with a flux, is in a purer condition than it was before the mixing operation. Careful investigation by me has shown that when a metal contains inclusions, i. e., admixtures of very fine particles (oxides, etc.), which can scarcely be removed by treatment with the usual fluxes, it is advantageous to disperse therein particles which are preferably of a larger size than those composing the inclusions, and thereafter, add a flux. For example, aluminum can in this manner be refined by dispersing therein grains of materials such as silica, bentonite, spinel, etc., preferably mixed with glass, and subsequently treating it with a flux containing, for example, NaF, KCl, $MgCl_2$, or other halide, or filtering, decanting or centrifuging. This application of the technique of my invention for the purpose of refining metals will be described with reference to the following example.

Example 17

10 kg. of Duralumin scraps, having the composition given in Example 9, are melted and treated with a flux in the usual manner. The metal thus obtained contains, admixed therewith, very fine oxide particles. The metal is maintained at a temperature about 5° above its melting point, and there is added thereto, with stirring, 0.5 kg. of a powder, of a 25 to 50 mesh size, composed of 92% alumina and 8% glass. The resultant suspension is left in a quiescent condition for one-half hour, and thereupon, 0.2 kg. of $MgCl_2.KCl$ are added with stirring, while the temperature is raised about 70° C. The mass separates out in distinct layers, and the metal can be recovered in a substantially clean, refined state without admixture of foreign particles.

I claim:

1. Process for producing a composite product containing a dispersion of at least one inorganic, non-metallic, solid substance other than a halide in a metallic material, wherein the substance is substantially insoluble, comprising the following steps: heating the metallic material to a temperature not less than the initial melting point thereof; adding the inorganic substance in particulate form to the heated material; adding with intimate mixing a wetting agent selected from the class consisting of alkali and alkaline-earth metals to the mix to lower thereby the surface tension between the substance and the metallic material, and continuing the intimate mixing of the ingredients to thereby form a uniform dispersion of the inorganic substance in the metallic material.

2. Process for producing a composite product containing a dispersion of at least one inorganic, non-metallic, solid substance other than a halide in a metallic material, wherein the substance is substantially insoluble, comprising the following steps: bringing together with intimate mixing a metallic material heated to a temperature not less than its initial melting point, an inorganic substance in particulate form and a wetting agent selected from the class consisting of alkali and alkaline earth metals, whereby the surface tension between the substance and the metallic material is lowered, and continuing the intimate mixing of the ingredients to thereby form a uniform dispersion of the inorganic substance in the metallic material.

3. Process according to claim 2, wherein the inorganic substance is a metallic oxide.

4. Process according to claim 2, wherein the inorganic substance is a carbide.

5. Process according to claim 2, wherein the inorganic substance is a carbide of one of the metalloids of the group consisting of boron and silicon.

6. Process according to claim 2, wherein the inorganic substance is an oxide of one of the metalloids of the group consisting of boron and silicon.

7. Process according to claim 2, wherein the substance is an ore.

8. Process according to claim 2, in which the metallic material is in a pasty condition when it is mixed with the inorganic substance.

9. Process for producing a dispersion of an inorganic substance in aluminum and aluminum alloys according to claim 2, wherein at least one alkaline earth metal is used as a wetting agent.

10. Process for producing a composite product containing a dispersion of at least one inorganic, non-metallic, solid substance other than a halide in a metallic material, wherein the substance is substantially insoluble, comprising the following steps: heating a mixture of a wetting agent, selected from the class consisting of alkali and alkaline-earth metals, and a metallic material to a temperature not less than the initial melting point of the latter; adding with intimate mixing the inorganic substance in particulate form to the heated mix, whereby the wetting agent lowers the surface tension between the substance and the metallic material, and continuing the intimate mixing of the ingredients to thereby form a uniform dispersion of the inorganic substance in the metallic material and cooling the resultant dispersion to solidify it.

References Cited in the file of this patent

UNITED STATES PATENTS

| | | |
|---|---|---|
| 1,024,561 | Davoren | Apr. 30, 1912 |
| 1,077,700 | Gleason | Nov. 4, 1913 |
| 1,382,147 | Vos | June 21, 1921 |
| 1,586,368 | Kegg | May 25, 1926 |
| 1,629,699 | Guertler | May 24, 1927 |
| 1,805,448 | Frary | May 12, 1931 |
| 1,935,245 | Kirsebom | Nov. 14, 1933 |
| 1,966,481 | Berthelemy | July 17, 1934 |
| 2,058,376 | Critchett | Oct. 20, 1936 |
| 2,096,252 | Koehring | Oct. 19, 1937 |
| 2,112,703 | Luschenowsky | Mar. 29, 1938 |
| 2,229,117 | Ness | Jan. 21, 1941 |
| 2,437,097 | King | Mar. 2, 1948 |
| 2,496,074 | Vignos | Jan. 31, 1950 |
| 2,545,438 | Stumbock | Mar. 20, 1951 |
| 2,639,232 | Vignos | May 19, 1953 |
| 2,671,019 | DuRostu | Mar. 2, 1954 |

FOREIGN PATENTS

| | | |
|---|---|---|
| 15,384 | Great Britain | July 1, 1909 |
| 221,082 | Great Britain | Sept. 4, 1924 |
| 500,657 | Great Britain | Feb. 14, 1939 |